(12) United States Patent
Chao

(10) Patent No.: US 6,886,845 B2
(45) Date of Patent: May 3, 2005

(54) DETACHABLE BICYCLE

(76) Inventor: Hung-Chang Chao, 6F, No. 21, Alley 29, Lane 372, Section 5, Chung-Shiao East Road, Taipei (TW)

( * ) Notice: Subject to any disclaimer, the term of this patent is extended or adjusted under 35 U.S.C. 154(b) by 0 days.

(21) Appl. No.: 10/422,997

(22) Filed: Apr. 25, 2003

(65) Prior Publication Data

US 2004/0212171 A1 Oct. 28, 2004

(51) Int. Cl.⁷ .............................................. B62K 15/00
(52) U.S. Cl. .................................... 280/278; 280/287
(58) Field of Search ................................ 280/278, 287, 280/281.1, 274, 288

(56) References Cited

U.S. PATENT DOCUMENTS

| | | | | |
|---|---|---|---|---|
| 1,427,402 A | * | 8/1922 | Malec | 403/342 |
| 1,428,496 A | * | 9/1922 | Roquefort-Villeneuve Jea | 280/278 |
| 3,608,917 A | * | 9/1971 | Cogliano | 280/7.16 |
| 3,680,879 A | * | 8/1972 | Cogliano | 280/7.16 |
| 3,854,755 A | * | 12/1974 | Tang | 280/278 |
| 4,252,335 A | * | 2/1981 | Brenner | 280/287 |
| 5,282,639 A | * | 2/1994 | Chen | 280/231 |
| 5,779,386 A | * | 7/1998 | Eichhorn | 403/329 |
| 5,975,551 A | * | 11/1999 | Montague et al. | 280/287 |
| 6,685,207 B1 | * | 2/2004 | Blake | 280/282 |
| 2002/0140203 A1 | * | 10/2002 | Chen | 280/287 |
| 2003/0080531 A1 | * | 5/2003 | Ritchey | 280/281.1 |

FOREIGN PATENT DOCUMENTS

| | | | |
|---|---|---|---|
| DE | 4232592 | * | 3/1994 |
| DE | 4237864 | * | 5/1994 |

* cited by examiner

*Primary Examiner*—Anne Marie Boehler
(74) *Attorney, Agent, or Firm*—Bacon & Thomas

(57) ABSTRACT

A detachable bicycle. The bicycle includes front and rear frame sections and a detachable device having a first assembly device including a lower first sleeve extended upward from a bottom bracket sleeved on a front axle of sprocket wheel. The first sleeve includes a snap member, and an upper second sleeve at a lower end of a seat tube. The second sleeve includes a mating snap member adapted to releasably couple to the snap member. The second assembly device is adjacent to the top of the seat tube. The second assembly device includes a first coupling device formed on the seat tube and a second coupling device formed at a forward end of the seat stay. The first and the second coupling devices are releasably coupled together.

7 Claims, 11 Drawing Sheets

DETACHABLE BICYCLE

BACKGROUND OF THE INVENTION

1. Field of the Invention

The present invention is to provide a bicycle structure with a detachable frame featuring easy to detach, assemble, place, and move, as well as the preservation of structure strength of overall frame.

2. Description of the Prior Art

Conventionally, the bicycle structure can be distinguished into two categories: steady frame and foldable frame (e.g. folding bicycle). The steady frame highlights strong frame structure and unrestrained style of appearance. For example, a rhombic frame, designed accordingly, is available and prevalent among consumers. The preceding frame has its weakness also, such as oversized, costly packing space. Additionally an electric bicycle is provided with a longer, heavy-weighted frame which is inconvenient for movement and storage. Nowadays, ordinary cars are equipped with an immobile rack on the top or at the trunk where bicycle(s) can be fastened and be carried to the suburbs. However, the fastening operation is much more complicated and, adversely, affects safety while driving.

The foldable frame (i.e. folding bicycle) is preferable in saving space of delivery and/or storage; particularly it is suitable for being carried by cars for outings. But they are also inferior for being structurally weak because a potential break may occur at the folded portions of the bicycle. For overcoming such problem, an enhancement is added at the folded portions. Unfortunately, such enhancement may detract the bicycle's appearance because many restrictions may be imposed on the bicycle design due to the provision of releasable fastening devices (e.g. snap members, ring fasteners or the like) thereon. As a result, only a few types of folding bicycles are popular in the market. Further, some folding bicycles even have an increased width after folded. This compromises the desired purpose of saving space in delivery and/or storage. Thus, the need for improvement still exists.

SUMMARY OF THE INVENTION

It is an object of the present invention to provide a detachable bicycle which can be quickly detached into at least two portions or assembled together in a do-it-yourself manner.

It is another object of the present invention to provide a detachable bicycle in which components of the detached bicycles can be effectively packed together so as to save storage space while going for an outing by driving one or more cars.

It is still another object of the present invention to provide a detachable bicycle featured a structural strength substantially the same as that of a typical bicycle featured a fixed frame.

It is a further object of the present invention to provide a detachable bicycle in which no restrictions are imposed on designs for preserving the bicycle's appearance the same as that of a typical bicycle featured a fixed frame. Also, the bicycle is adapted to any variety of bicycles such as bicycles with a rhombic frame or Y frame, or lady bicycles.

To achieve the above and other objects, the present invention provides a frame of a detachable bicycle, comprising a front frame section comprising a head tube, a fork, a stem, a front wheel releasably coupled to the fork, a top tube, a down tube, a seat tube interconnected rear ends of both the top tube and the down tube, a seat post extended upward from the seat tube, and a saddle on the seat post; a rear frame section comprising two foot pedals, a sprocket wheel, a bottom bracket coupled to both the foot pedals and a front axle of the sprocket wheel, a chain stay extended rearward from the bottom bracket to an axle of a rear wheel, and a seat stay featured a rear end coupled to the axle of the rear wheel; and detachable means comprising a first assembly device including a lower first sleeve extended upward from the bottom bracket, the first sleeve including a snap member, and an upper second sleeve at the lower end of the seat tube, the second sleeve with a mating snap member adapted to releasably couple to the snap member of the first sleeve; and a second assembly device adjacent a top end of the seat tube, the second assembly device including a first coupling device formed on the seat tube and a second coupling device formed at a forward end of the seat stay, the first and the second coupling devices being releasably coupled together.

BRIEF DESCRIPTION OF THE DRAWINGS

The drawings, shown as in the following, disclose the illustrative embodiments of the present invention which serves to exemplify various advantages and objects hereof.

DETAILED DESCRIPTION OF THE INVENTION

Figure 1:
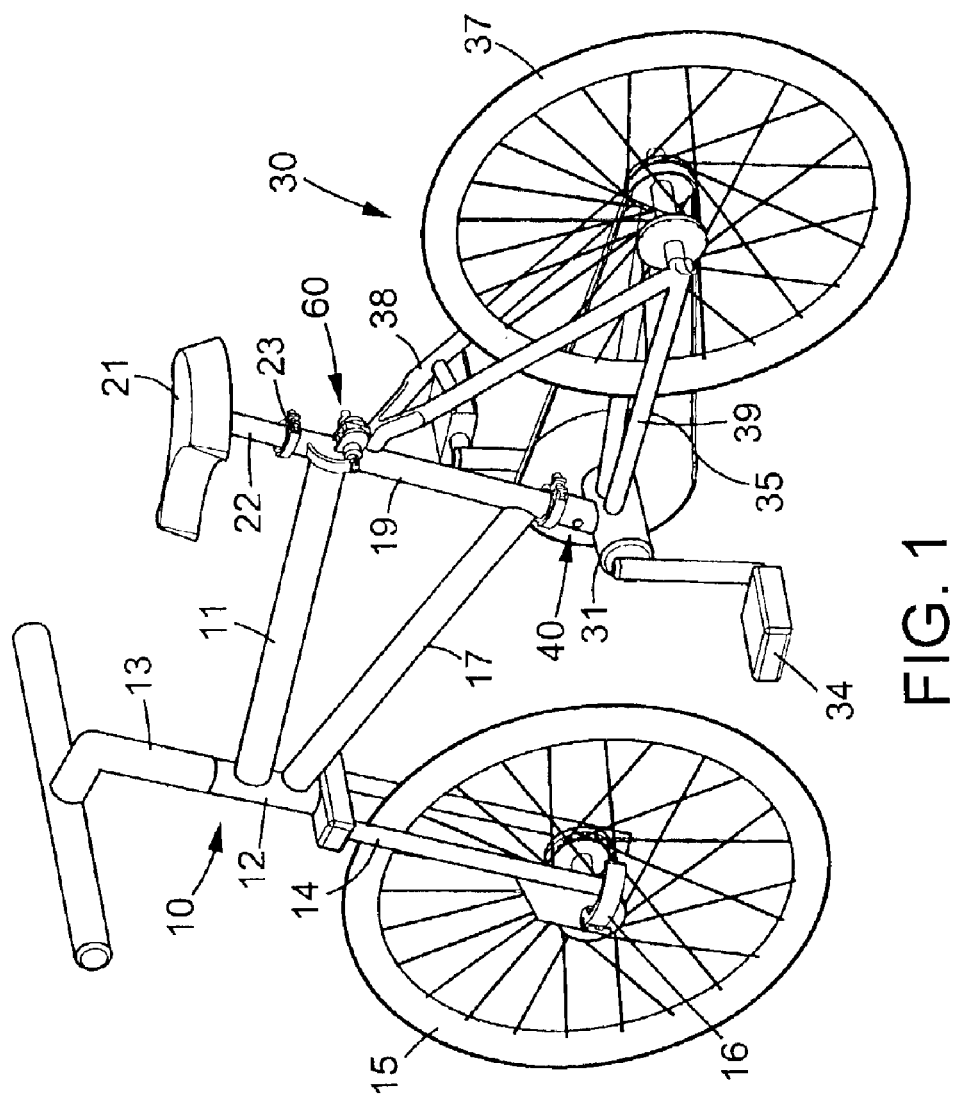
FIG. 1 is a perspective view of a first preferred embodiment of detachable bicycle according to the invention.
Figure 2:
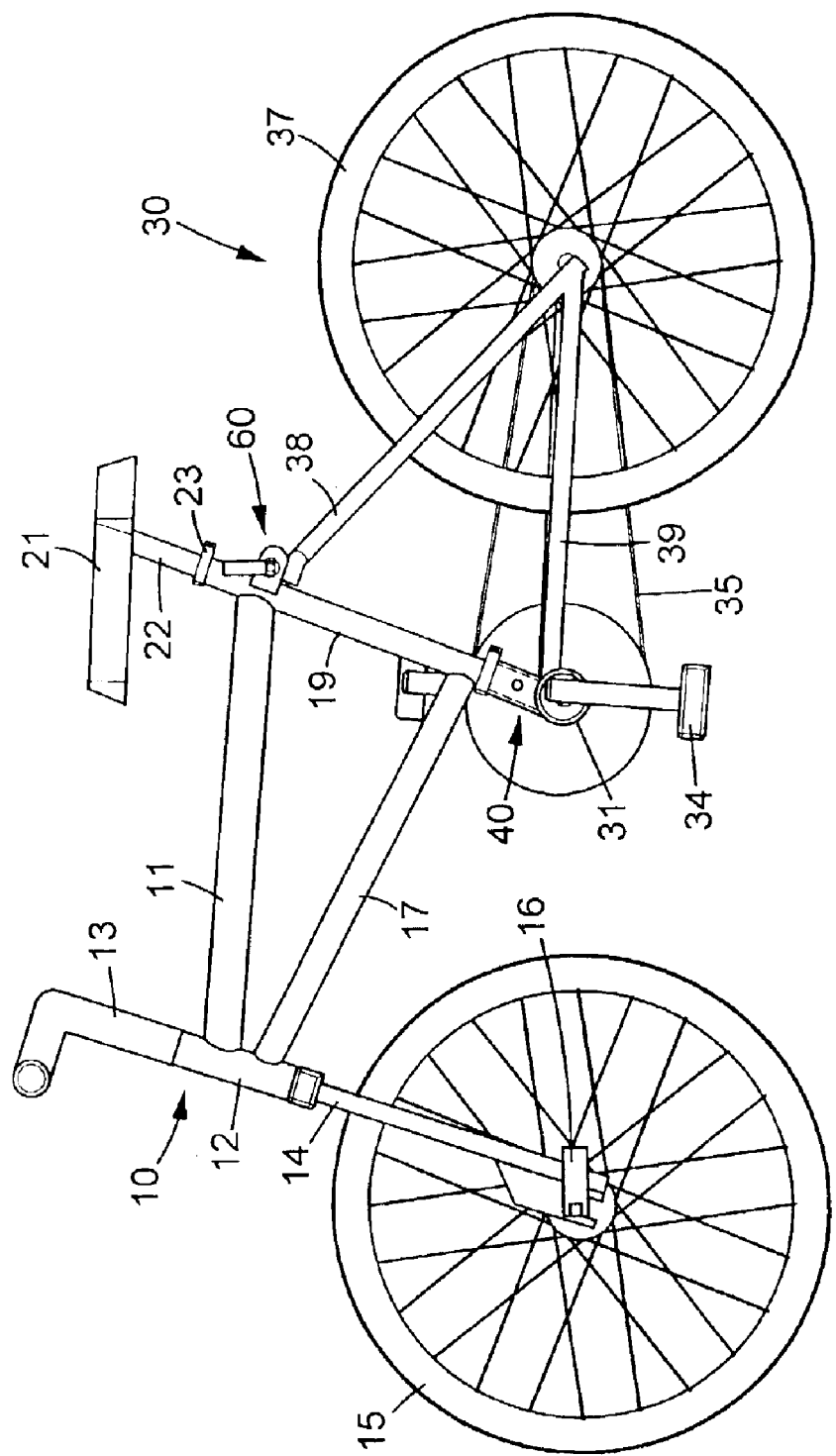
FIG. 2 is a side plan view of FIG. 1.
Figure 3:
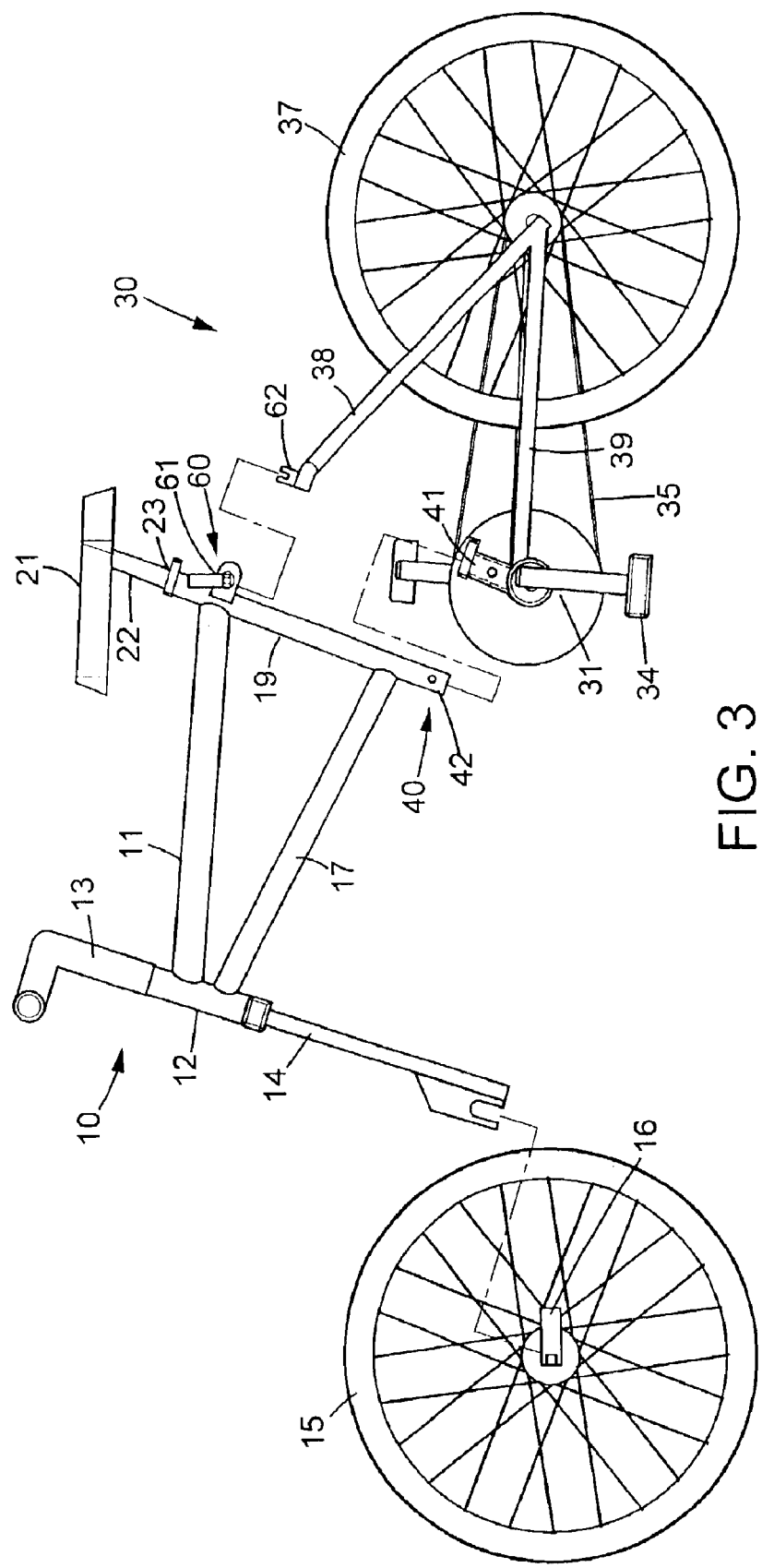
FIG. 3 is a side plan view of the detached bicycle shown in FIG. 2 where the bicycle has been detached.

Please refer to FIGS. 1 to 3 for a detachable bicycle constructed in accordance with a first preferred embodiment of the invention. The bicycle comprises a front frame section 10 and a rear frame section 30 adapted to assemble with the front frame section 10 by means of a first assembly device 40 and a second assembly device 60.

The front frame section 10 comprises a head tube 12, a fork 14, a stem 13, a front wheel 15 releasably coupled to the fork 14 by means of a combination of well known bolts and nuts or a quick release 16, a top tube 11, a down tube 17 both extended rearward from the head tube 12, a seat tube 19 interconnected rear ends of both the top tube 11 and the down tube 17, a seat post 22 extended upward from the seat tube 19, the seat post 22 being releasably secured to the seat tube 19 by means of a ring fastener 23 or the like, and a saddle 21 on top of the seat post 22. While a rhomb is shown, Y or one of other popular shapes can also be formed by the top tube 11, the down tube 17, and the seat tube 19.

The rear frame section 30 comprises a bottom bracket 31 coupled to foot pedals 34 and a front axle of a sprocket wheel 35, a chain stay 39 extended rearward from the bottom bracket 31, and a seat stay 38 extended upwardly, obliquely from axle of a rear wheel 37 to be releasably couple to the seat tube 19 (as detailed later). This forms the frame of the detachable bicycle of the invention.

Figure 4:
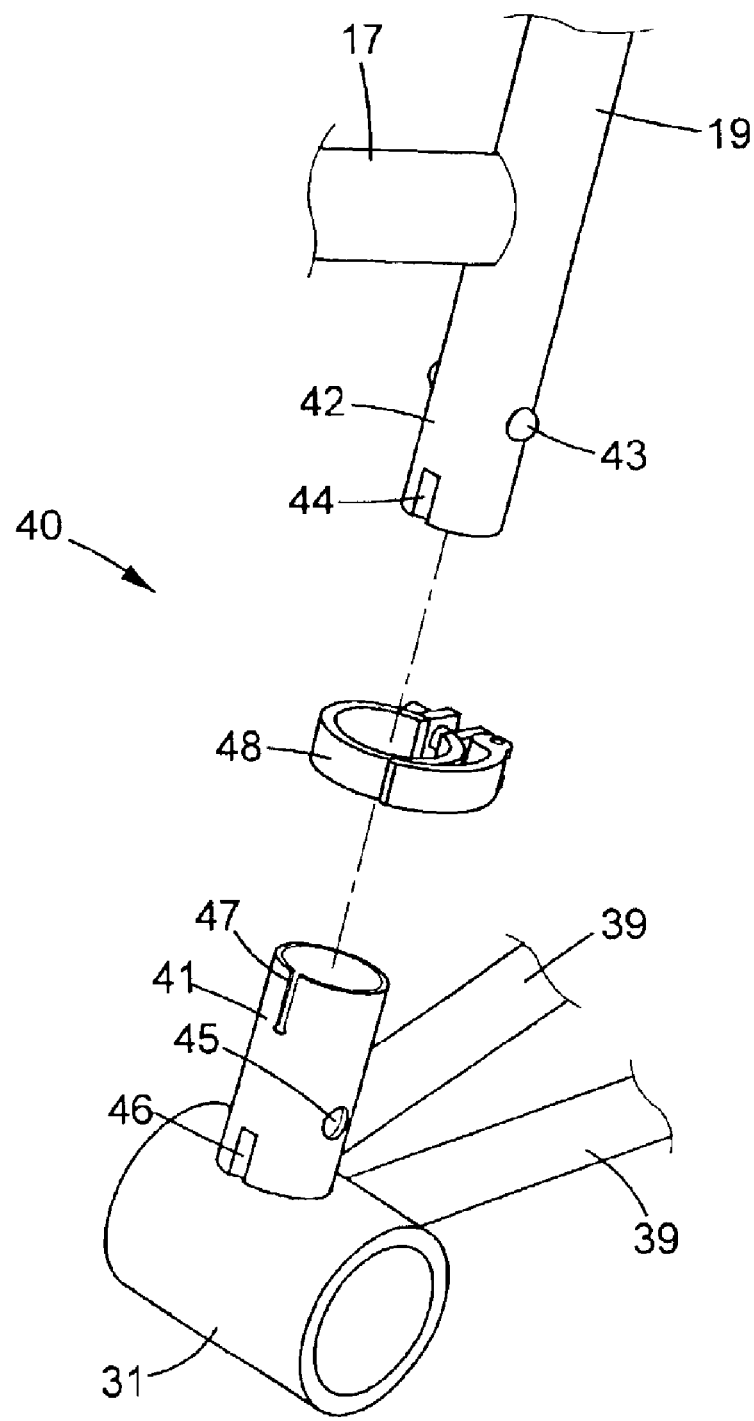
FIG. 4 is an exploded view of first assembly device shown in FIG. 1.

Referring to FIG. 4, the first assembly device 40 comprises a lower first sleeve 41 and an upper second sleeve 42. In detail, the second sleeve 42 comprises two opposite depressible spring detents 43 on the seat tube 19 and a recess 44 at a bottom of the seat tube 19 adjacent the detents 43. The first sleeve 41 is implemented as a short tube fixed to top of the bottom bracket 31 and comprises two opposite apertures 45 for releasably coupling to the detents 43 when the second sleeve 42 is inserted into the first sleeve 41, a bottom recess 46 aligned with the recess 44 when the detents 43 are projected from the apertures 45, and a top radial slit 47 for permitting the top of the first sleeve 41 to be capable of radially, flexibly compressing when a compression force is exerted inward, radially on the top of the first sleeve 41. The first assembly device 40 further comprises a ring fastener 48 put on the top of the first sleeve 41 for applying an inward force for further fastening the first and second sleeves 41, 42 together.

Figure 5:
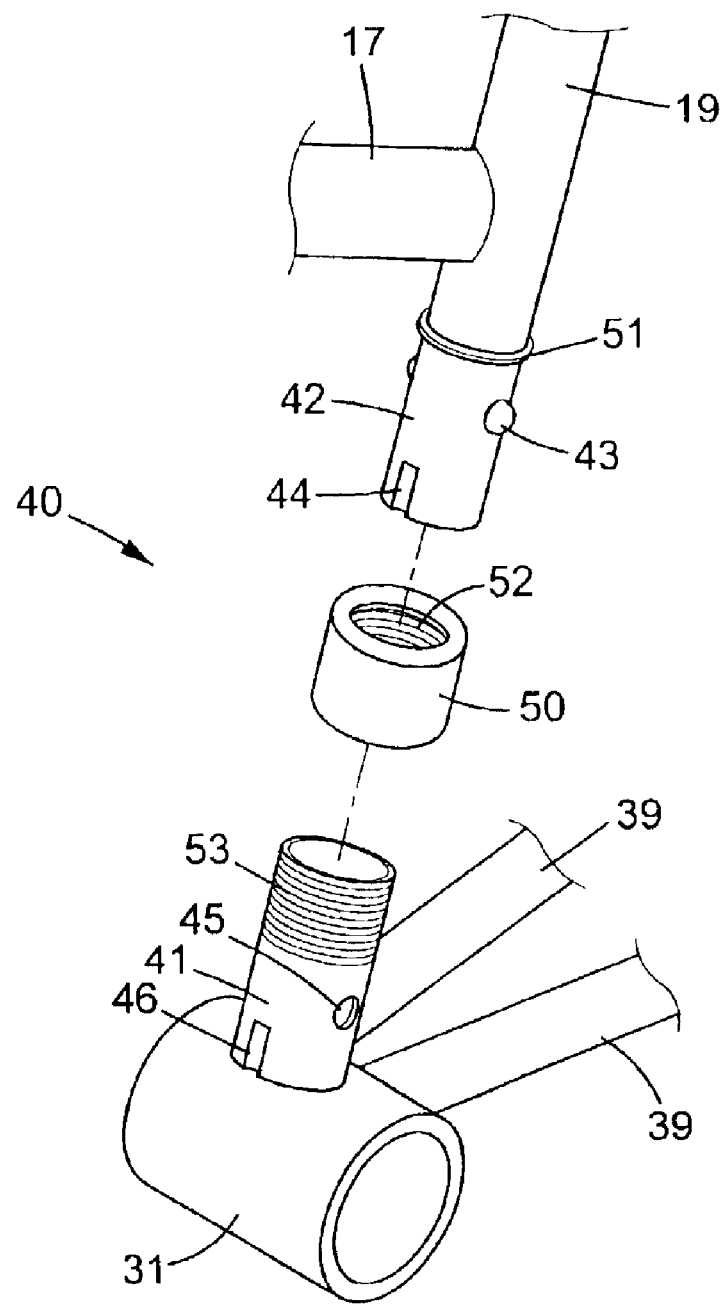
FIG. 5 is a view similar to FIG. 4 showing another configuration of the first assembly device.

Referring to FIG. 5, in another configuration of the first assembly device 40 the ring fastener 48 is replaced by a union 50 featured an inner thread 52, a top of the first sleeve 41 is formed as an outer threaded member 53, and an annular projection 51 is formed above the detents 43 in which after the second sleeve 42 has inserted in the first sleeve 41, a bottom of the union 50 is stopped by the annular projection 51 as the union 50 is secured to the outer threaded member 53 for further fastening the first and second sleeves 41, 42 together.

Figure 6:
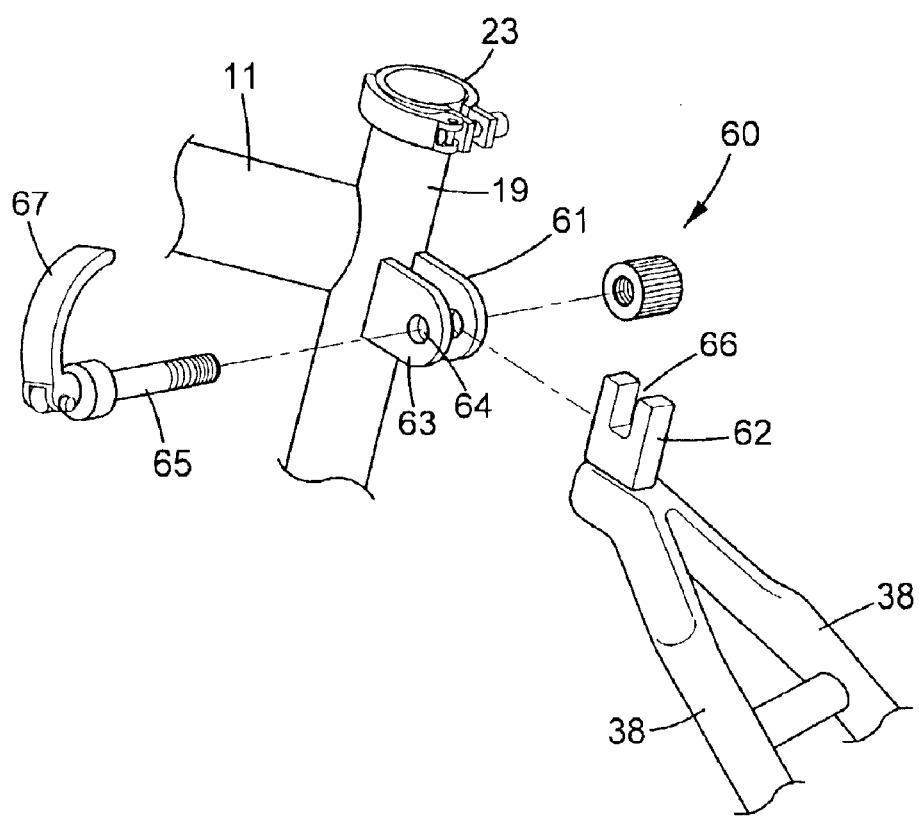
FIG. 6 is an exploded view of the second assembly device shown in FIG. 1.

Referring to FIG. 6, the second assembly device 60 comprises a coupling device 61 formed on the seat tube 19, the coupling device 61 consisting of two parallel plates 63 each featured a hole 64, a bifurcation 62 featured a channel 66, the bifurcation 62 being formed at a forward end of the seat stay 38, and a quick release 65 featured a threaded shank in which the quick release 65 is inserted through the holes 64 and the channel 66, then pivot a latch 67 of the quick release 65 to compress the plates 63 toward each other, and finally secure the quick release 65 by a nut (not numbered). Note that both the quick release 65 and the ring fastener 48 are well known devices. Further, a disassembly of each of the first and second assembly devices 40, 60 is obvious to those skilled in the art. Thus a detailed description thereof is omitted herein for the sake of brevity.

Figure 7:
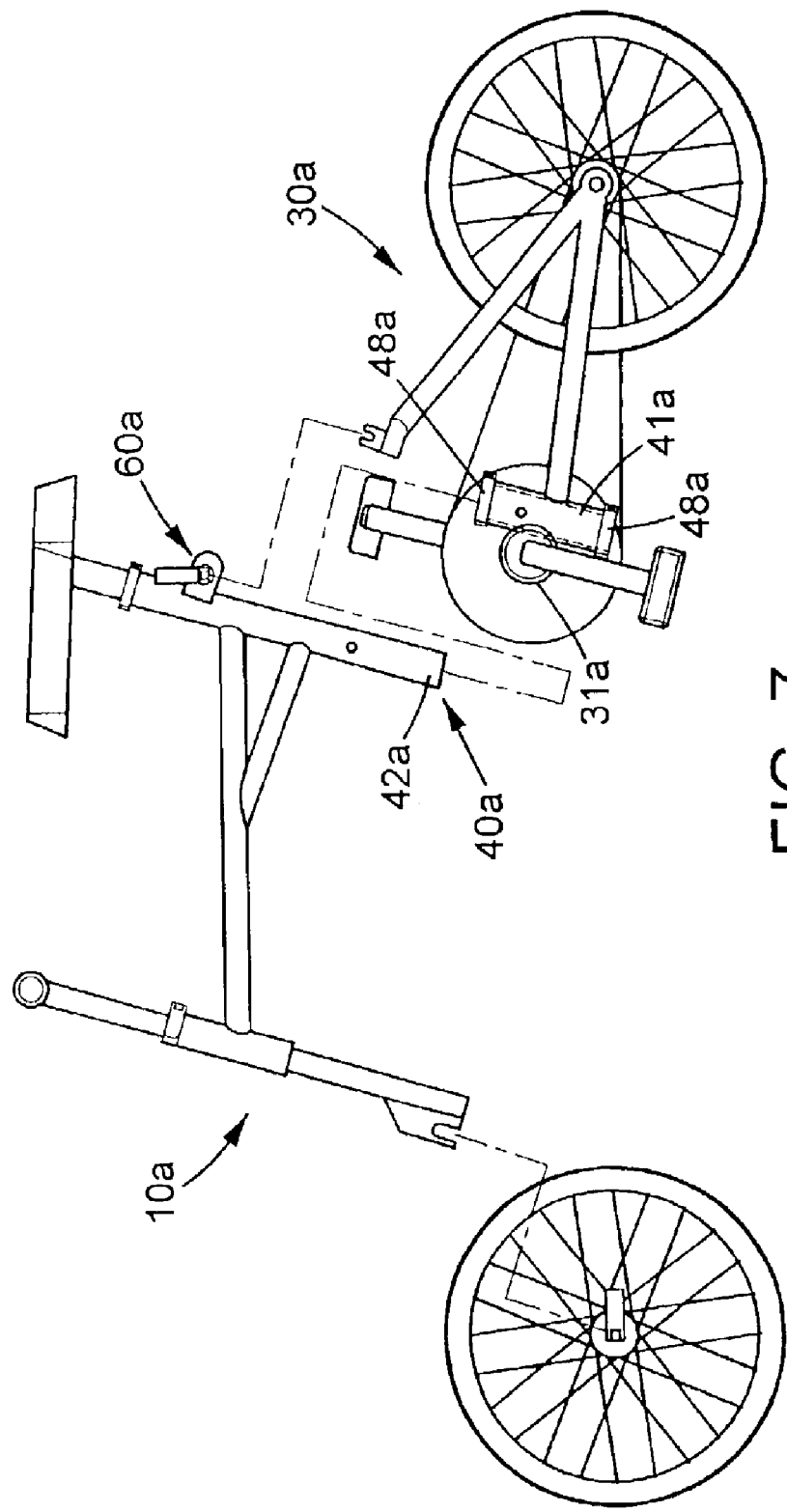
FIG. 7 is a side plan view of the second preferred embodiment of detachable bicycle according to the invention where the bicycle has been detached.

Referring to FIG. 7, there is a detachable bicycle constructed in accordance with a second of the invention. The bicycle is designed as a child bicycle. The front frame section 10a, the rear frame section 30a, and the second assembly device 60a are substantially the same as the first preferred embodiment with only a minor change in length and shape so that 16-inch tires can be fitted on its wheels. The differences between the first and the second preferred embodiments, i.e. the characteristics of the second preferred embodiment are detailed below. The first sleeve 41a of the first assembly device 40a is formed in a position behind the bottom bracket 31a rather than a position on top of the bottom bracket 31. Also, the first sleeve 41a is an open tube, i.e. featured two openings. Further, two ring fasteners 48a are provided at the openings of the first sleeve 41a for fastening the first and second sleeve 41a, 42a together as the second sleeve 42a is inserted in the first sleeve 41a. The second preferred embodiment aims at lower height of the child bicycle.

Figure 8:
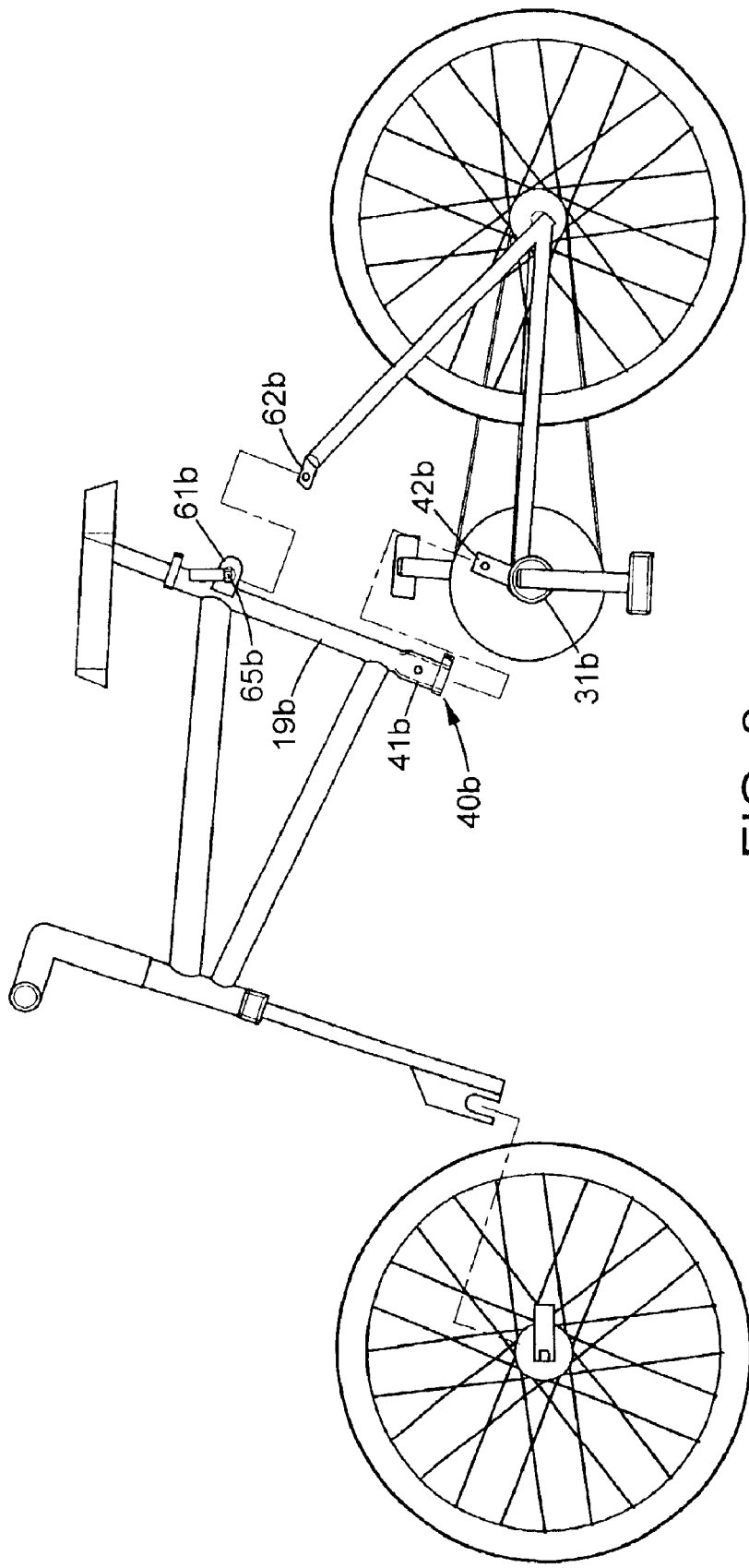
FIG. 8 is a side plan view of the third preferred embodiment of detachable bicycle according to the invention where the bicycle has been detached.

Referring to FIG. 8, there is a detachable bicycle constructed in accordance with a third of the invention. The third preferred embodiment substantially has the same structure as the first preferred embodiment except the followings. The first sleeve 41b and the second sleeve 42b are exchanged in position. That is, the first sleeve 41b is formed at a bottom of the seat tube 19b and the second sleeve 42b is formed on the bottom bracket 31b. Further, the bifurcation is replaced by a holed member 62b for permitting the quick release 65b to insert through. This can also enhance a fastening of the holed member 62b and the coupling device 61b.

Figure 9:
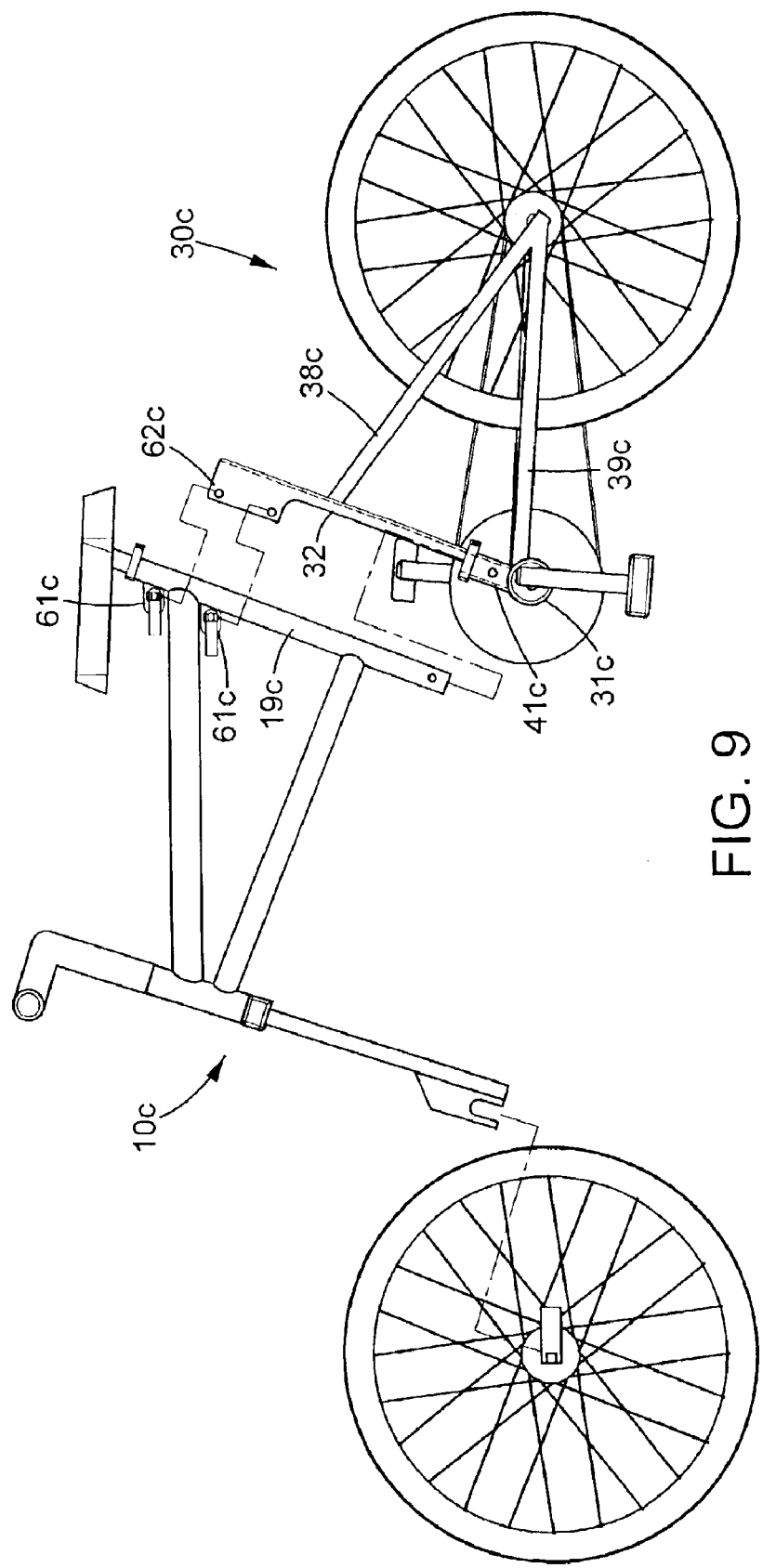
FIG. 9 is a side plan view of the fourth preferred embodiment of detachable bicycle according to the invention where the bicycle has been detached.

Referring to FIG. 9, there is a detachable bicycle constructed in accordance with a fourth of the invention. The fourth preferred embodiment aims at increasing a structural strength of the rear frame section 30c in which the rear frame section 30c can maintain a triangular shape even after it has been detached from the front frame section 10c. In detail, a semicircular reinforced tube 32 is extended upwardly from the first sleeve 41c for partially, lengthwise receiving the seat tube 19c. A forward end of the seat stay 38c is secured to a portion of the reinforced tube 32 near its top. The fastening member 62c is provided on the top of the reinforced tube 32 rather than at the forward end of the seat stay 38c. The fastening member 62c is also releasably secured to the coupling device 61c.

Figure 10:
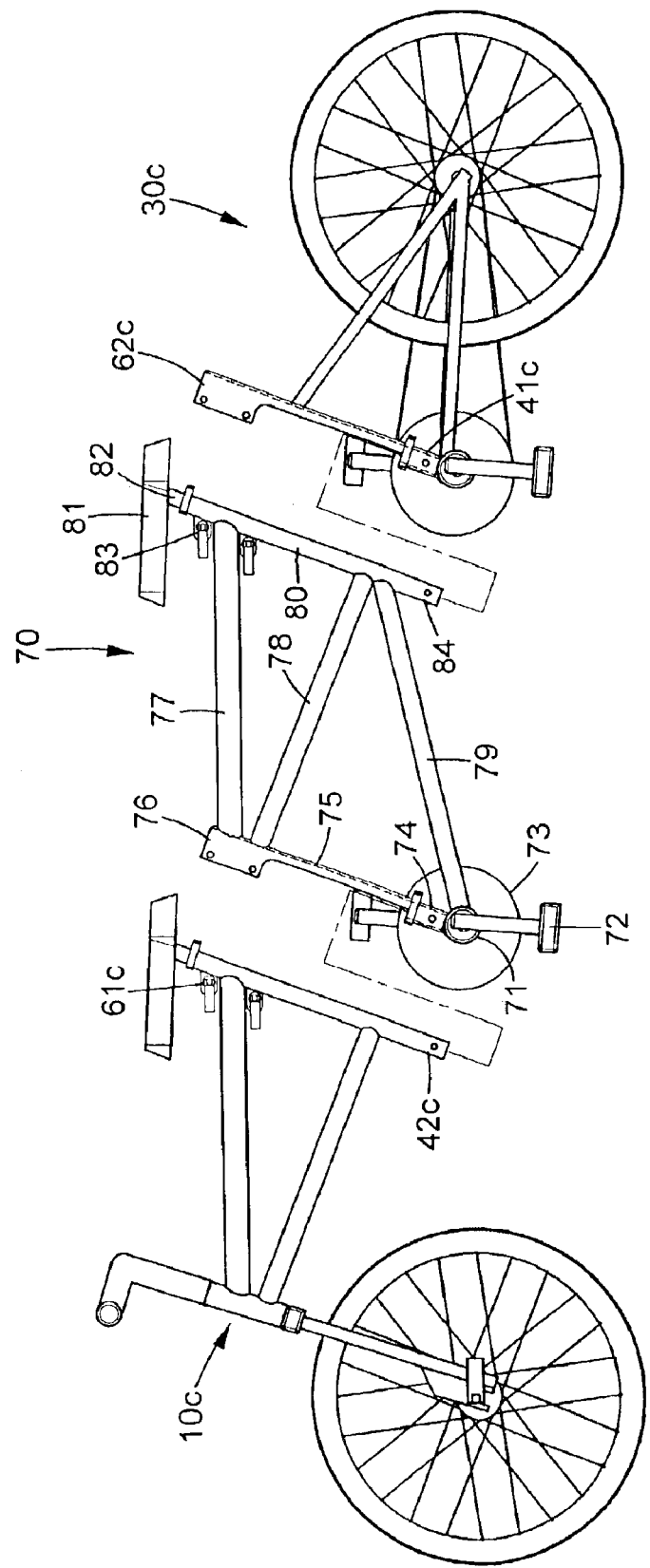
FIG. 10 is a side plan view of a tandem bicycle consisting of the FIG. 9 bicycle and an intermediate frame according to the invention.
Figure 11:
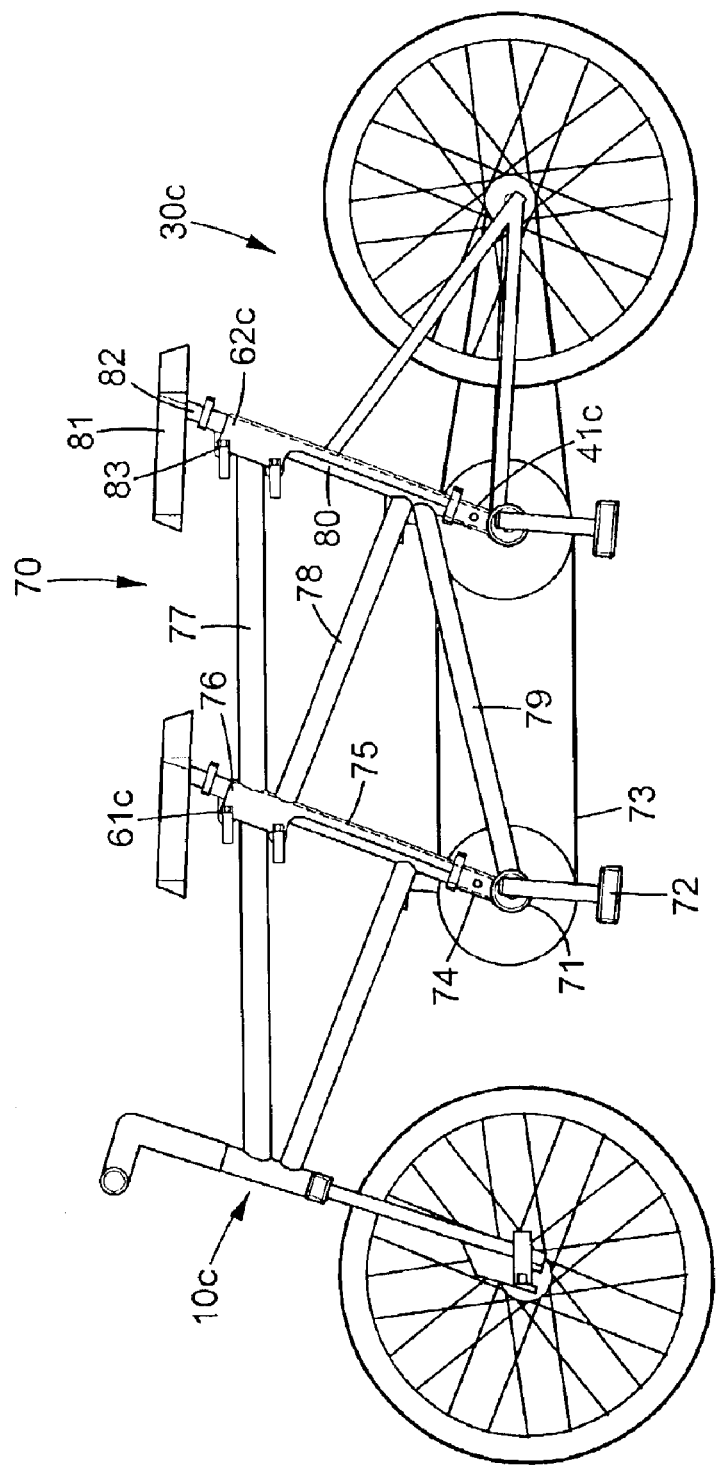
FIG. 11 is a side plan view of the assembled tandem bicycle.

A tandem bicycle, as in FIGS. 10 and 11, consists of the FIG. 9 bicycle and an intermediate frame 70 according to the invention. The front frame section 10c and the rear frame section 30c are releasably coupled together by the intermediate frame 70. The intermediate frame 70 comprises a bottom bracket 71, foot pedals 72, a sprocket wheel 73, a first sleeve 74, a semicircular reinforced tube 75, and a fastening member 76. These elements are the same as the corresponding ones of the rear frame section 30c. Thus a detailed description thereof is omitted herein for the sake of brevity. In other words, the function of the rear frame section 30c can be replaced by a corresponding forward portion of the intermediate frame 70 which is releasably coupled to the second sleeve 42c and the coupling device 61c of the front frame section 10c. The intermediate frame 70 further comprises a top tube 77, a down tube 78, and a crossbar 79 formed together with the forward portion and rearward elements including a seat tube 80, a second sleeve 84, a seat post 82, a saddle 81, and a coupling device 83. Also, these elements are the same as the corresponding ones of the front frame section 10c. Thus a detailed description thereof is omitted herein for the sake of brevity. In other words, the function of the front frame section 10c can be replaced by a corresponding rearward portion of the intermediate frame 70 which is releasably coupled to the first sleeve 41c and the fastening member 62c of the rear frame section 30c.

Preferably, a foot brake is incorporated in any of the above preferred embodiments as a replacement of the conventional brake cable. Such replacement has the advantages of saving time in assembling or detaching the brake cable and preserving the bicycle's appearance. The foot brake is well known in the art. Thus a detailed description thereof is omitted herein for the sake of brevity.

In another case that the conventional brake cable is used a quick release mechanism should be provided therein. In detail, male and female snap members or hooks may be formed at a releasably connectable portion of the brake cable.

The advantages of the invention include:

1) Space saving. Components of several detached bicycles can be effectively packed together so as to save storage space while going for an outing by driving one or more cars.
2) Easy assembly and disassembly. Skill is not important in assembling or detaching the bicycle in any place any time. In other words, the assembly or disassembly of the bicycle can be done in a do-it-yourself manner.
3) Packing material can be reduced up to 60%. Thus, cost related to delivery borne on the manufacturer is significantly reduced.
4) Easy to be transported by detaching the bicycle into at least two portions. This is a significant advantage for electric bicycles.
5) Featuring a structural strength substantially which is quite similar to that of a bicycle with a fixed frame.
6) Saving the cost related to transportation and storage.
7) High adaptability. The invention is adapted to one of a variety of bicycles such as bicycles featured a rhombic frame or Y frame, or lady bicycles. Also, the invention is adapted to incorporate 12-inch, 16-inch, 20-inch, 24 inch, or 26-inch tires.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A detachable bicycle, comprising:
    a front frame section comprising a head tube, a fork, a stem, a front wheel releasably coupled to the fork, a top tube, a down tube, a seat tube interconnected rear ends of both the top tube and the down tube, a seat post extended upward from the seat tube, and a saddle on the seat post;
    a rear frame section comprising two foot pedals, a sprocket wheel, a bottom bracket coupled to both the foot pedals and a front axle of the sprocket wheel, a chain stay extended rearward from the bottom bracket to an axle of a rear wheel, and a seat stay comprising a rear end coupled to the axle of the rear wheel; and
    detachable means comprising a first assembly device including a lower first sleeve extended upward from the bottom bracket, the first sleeve including a snap member, and an upper second sleeve at a lower end of the seat tube, the second sleeve featured a mating snap member adapted to releasably couple to the snap member of the first sleeve; and a second assembly device adjacent a top end of the seat tube, the second assembly device including a first coupling device formed on the seat tube and a second coupling device formed at a forward end of the seat stay, the first and the second coupling devices being releasably coupled together;
    wherein the first sleeve further comprises at least one top radial slit so that a top of the first sleeve is adapted to radially, flexibly compress when a compression force is exerted inward, radially thereon, and further comprising a ring fastener put on the top of the first sleeve for applying an inward force for fastening the first and the second sleeves together.

2. The detachable bicycle of claim 1, wherein the mating snap member of the second sleeve comprises two opposite depressible spring detents on the seat tube and a first recess at a bottom of the seat tube adjacent the detents; and the snap member of the first sleeve comprises two opposite apertures releasably coupled to the detents when the second sleeve is inserted into the first sleeve, and a bottom recess aligned with the first recess when the detents are projected from the apertures.

3. The detachable bicycle of claim 1, wherein the mating snap member of the second sleeve comprises two opposite depressible spring detents on the seat tube, a first recess at a bottom of the seat tube adjacent the detents, and an annular projection above the detents; the snap member of the first sleeve comprises two opposite apertures, a bottom recess, and an upper, outer threaded member; and further comprising a union featured an inner thread so that in response to an insertion of the second sleeve in the first sleeve, detents are projected from the apertures, the bottom recess is aligned with the first recess, and a bottom of the union is stopped by the annular projection as the union is threadedly secured to the upper, outer threaded member for fastening the first and the second sleeves together.

4. The detachable bicycle of claim 1, wherein the first coupling device comprises two parallel plates each featured a hole, and the second coupling device comprises a bifurcation featured a channel, and further comprising a quick release inserted through the holes and the channel so that a pivoting of the quick release is capable of compressing the plates toward each other for fastening the first and the second coupling devices together.

5. The detachable bicycle of claim 1, wherein the first sleeve is formed in a position behind the bottom bracket, and further comprising two ring fasteners at two openings of the first sleeve for fastening the first and second sleeve together as the second sleeve is inserted in the first sleeve.

6. The detachable bicycle of claim 1, further comprising a semicircular reinforced tube is extended upwardly from the first sleeve for partially, lengthwise receiving the seat tube and wherein the forward end of the seat stay is secured to the reinforced tube and the second coupling device is provided on a top of the reinforced tube for releasably securing to the first coupling device.

7. The detachable bicycle of claim 6, further comprising an intermediate frame including a forward portion as a replacement of the rear frame section and a rearward portion as a replacement of the front frame section so that the forward portion of the intermediate frame is adapted to releasably couple to the second sleeve and the first coupling device and the rearward portion of the intermediate frame is adapted to releasably couple to the first sleeve and the second coupling device on the reinforced tube.

* * * * *